UNITED STATES PATENT OFFICE.

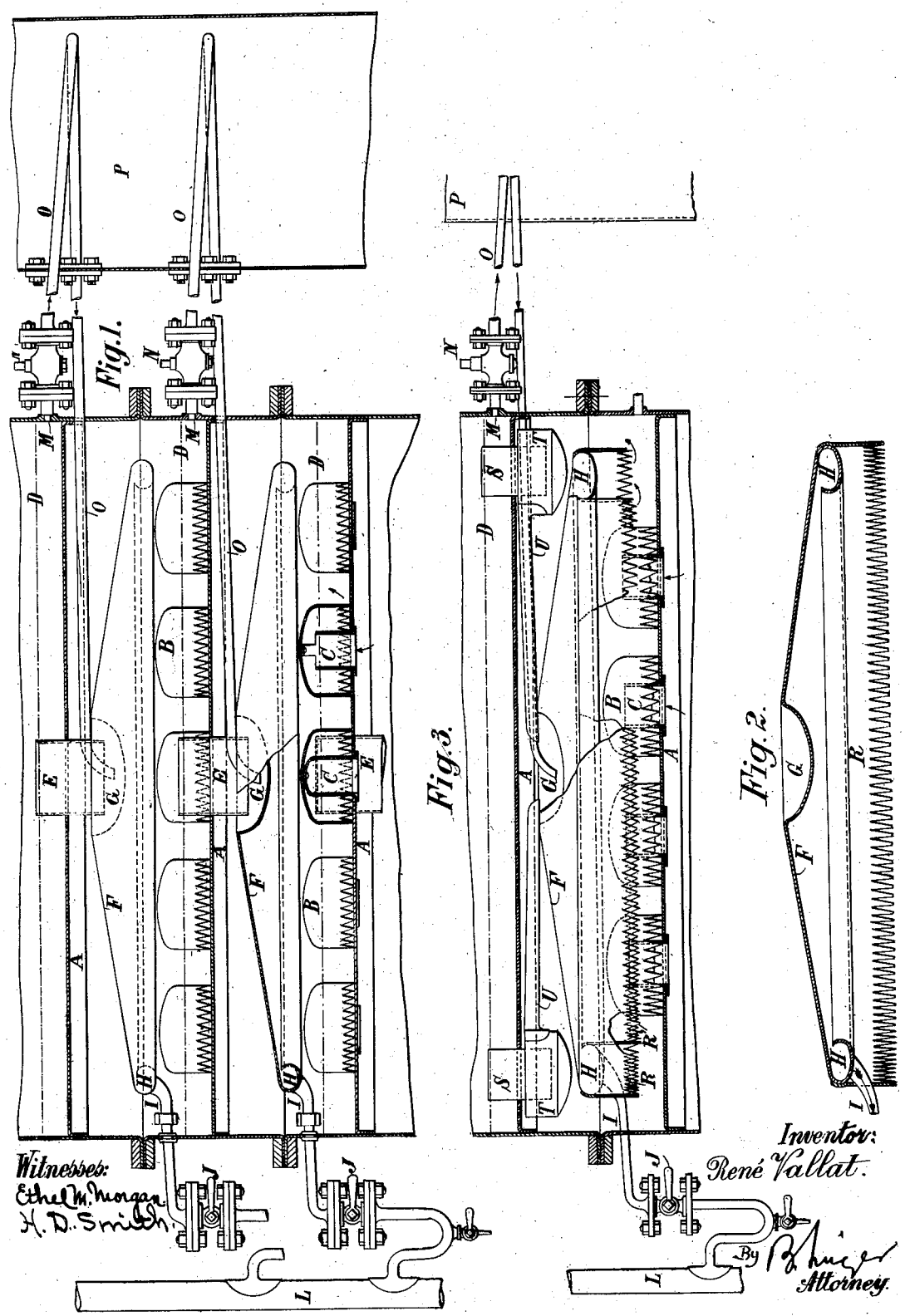

RENÉ VALLAT, OF PARIS, FRANCE, ASSIGNOR TO GUSTAVUS ADOLPHUS PFIZER, OF PARIS, FRANCE.

DISTILLING AND RECTIFYING APPARATUS.

974,213.  Specification of Letters Patent.  Patented Nov. 1, 1910.

Application filed February 23, 1909. Serial No. 479,395.

*To all whom it may concern:*

Be it known that I, RENÉ VALLAT, a citizen of the French Republic, and resident of Paris, France, have invented certain new and useful Improvements in Distilling and Rectifying Apparatus, of which the following is a specification.

The object of this invention is to provide means for extracting the impurities contained in alcoholic liquids from each of the plates or trays employed in distilling or rectifying columns and to provide means for separating and extracting the liquids having different points of ebullition and subjecting the same either to distillation or to rectification.

To this end the invention consists in making use of condensing and extracting members which simultaneously are adapted to serve as concentrating members.

The accompanying drawings show various forms of embodiments of the invention, and in these drawings: Figure 1 is a vertical section of parts of a rectifying column used in connection with alcohols and provided with condensing and extracting members. Fig. 2 is a similar view of the main condensing and extracting member already shown in Fig. 1, but provided with some modifications. Fig. 3 is a similar view of a device similar to that shown by Figs. 1 and 2 but provided with some modifications.

In the form of embodiment shown by Fig. 1, A designates an ordinary chamber or plate of a distilling column, provided with caps B which produce the usual bubbling up of the alcoholic vapor in the alcoholic liquid contained in the chamber and rest on the plate. The caps B are advisably provided with serrated edges as shown in the drawing. A metallic hood F which is arranged above the caps B and is provided at its top with a concave portion G, serves the purpose of receiving on its entire surface the feed liquid which is conveyed into the same from the overflow E of the upper plate. This feed liquid therefore irrigates the entire hood F and thus causes the alcoholic vapor to condense, said vapor rising, from below, against the said head or hood. If the feed liquid which flows over the hood F does not cool the rising alcoholic vapors to a sufficient extent, then a part of this liquid may be conveyed out of the column and caused to be refrigerated in an outer receptacle P containing cold water. An escape opening M is provided for this purpose in the side wall of the column below the level of the liquid which is supported by the plate A. This escape opening M communicates with a control cock N connected with the pipes O which, extending through the outer refrigerating member P return the feed liquid into the column and discharge the same into the concave portion G of the hood F. The returned feed liquid mixes here with the feed liquid arriving from the overflow E. A gutter H soldered to the head F has for its object to receive the impurities coming from the vapor condensed on the inner surface of the hood, and the pipe I which is secured to the gutter H serves to convey said impurities out of the column and to discharge them into the collector pipe L. The cock J is intended to control the discharge of these impurities.

Fig. 1 shows two column chambers or plates constructed in a manner similar to that of the chamber or plate described above.

Fig. 2 shows the main condensing and extracting hood F described above, provided with a serrated metal rim R secured to the periphery of the hood F and preferably soldered on the outer edge of the gutter H. The tooth points of the edge of this rim extend into the alcoholic liquid contained in the chamber. The hood therefore serves the purpose of causing a supplemental formation of bubbles and consequently a supplemental concentration.

Fig. 3 shows the condensing and extracting members described above with the modification that the feed liquid which flows over the hood F, instead of arriving through one single central overflow (as in Fig. 1) arrives through two overflows S which dip into two receptacles T provided with long spouts U. This Fig. 3 also shows a condensing member and extracting member provided with the metallic serrated rim (Fig. 2). In addition to this rim a second baffled metallic rim R' is shown which second rim is preferably soldered on the inner edge of the gutter H of the hood F. This second rim R' extends somewhat deeper with the points of its teeth into the liquid contained in the chamber of the column, than the first named rim.

The condensing hoods or any members adapted to accomplish the same functions must necessarily have a surface which is sufficiently inclined to allow the somewhat impure alcoholic vapor or any other vapors which are condensed on the surfaces of the hoods to flow into the gutters. In case where no impurities are to be extracted, but where only liquids are to be separated having different points of ebullition, it is only necessary to dimension the gutter and the pipes in a different way.

The hoods of similar condensing and extracting members can be made of corrugated metal or adapted and constructed in any other way to facilitate the spreading of the liquid over the entire surface.

It is obvious that by reducing the size of the hoods the same may perform the functions of the caps B and may be used in place of said caps, when they are provided with serrated rims. In this case the hoods may be secured on the plates above the pipes through which the alcoholic vapor is conveyed instead of being disposed above the caps as shown in the drawings.

The invention may be applied to any of the distilling columns employed for the manufacture of the various kinds of brandy. As a matter of fact, most of these distilling plants are provided with hoods or similar members which are cooled by means of water, and therefore it will only be necessary to add an inner circular gutter adapted to gather the condensed impurities and to discharge them partly or completely by means of extracting pipes.

Having now fully described my said invention, what I claim and desire to secure by Letters Patent is:—

1. In a distilling apparatus of the kind described the combination with the chambers and plates of the apparatus, the bubbling members and overflow thereof, of a hood having inclined walls and arranged over the said bubbling members said hood being adapted to receive from below the vapors rising from the said bubbling members, means for causing the feed liquid discharged by the said overflow to flow over the entire surface of the said hood and to cool the same so as to cause the condensation of said vapors, a gutter connected to the lower edge of said hood and adapted to collect the product of condensation of said vapors and means for discharging the said products of condensation.

2. In a distilling apparatus of the kind described the combination with the chambers and plates of the apparatus, the bubbling members and overflow thereof, of a hood having inclined walls disposed above the said bubbling members and being adapted to receive from below the vapors rising therefrom, a concave portion provided in the top of said hood and arranged under the said overflow so as to receive the liquid overflowing from the latter and to cause it to trickle down over the upper surface of said hood, a gutter secured to the lower edge of said hood and adapted to collect the products of the condensation which form on the inner side of the hood, a pipe leading from the said gutter to the outside of the apparatus and a control cock in the said pipe.

3. In a distilling apparatus of the kind described the combination with the chambers and the plates of the apparatus the bubbling members thereof and overflow thereof of a cone shaped hood arranged above the said bubbling members, a central concave portion provided at the top of said hood, means for conveying into the said portion the liquid coming from the said overflow, a gutter at the lower edge of said hood, a duct leading from the said gutter to the outside of the apparatus, means for controlling the said duct, a serrated rim secured to the lower edge of said hood and adapted to dip into the liquid contained in the chamber of the distilling apparatus.

4. In a distilling apparatus of the kind described the combination with the chambers and plates of the apparatus, the bubbling members and overflow thereof, of a cone shaped hood arranged over the said bubbling members, a central concave portion provided at the top of said hood, means for conveying into the said portion the liquid discharged from the said overflow, a gutter secured to the lower edge of said conical hood, a duct leading from the said gutter to the outside of the apparatus, means for controlling the said duct, a serrated rim secured to the outside edge of the said gutter and adapted to dip into the liquid contained in the said chamber of the distilling apparatus and a second serrated rim secured to the inside of edge of the said gutter and extending into the said liquid deeper than the first named serrated rim.

5. In a distilling apparatus of the kind described the combination with the chambers and plates of the apparatus, the bubbling members and overflows thereof, of a cone shaped hood arranged over the said bubbling members, a central concave portion provided at the top of the said hood, means for conveying into the said portion the liquid discharged from the said overflows, a gutter at the lower edge of said conical hood, a duct leading from the said gutter to the outside of the distilling apparatus and means for controlling the said duct.

6. In a distilling apparatus of the kind described the combination with the chambers, plates, bubbling members and overflow of the apparatus, of a cone shaped hood arranged over the said bubbling members, a central concave portion provided at the top of the said hood, means for conveying into the said portion the liquid discharged from the said overflow, means for refrigerating artificially a part of the feed liquid and conveying it into the said dish, a gutter provided at the lower end of said hood and a controllable duct leading from the said duct gutter out of the apparatus.

7. In a distilling apparatus of the kind described the combination with the chambers, the plates, the bubbling members and the overflow of the apparatus of a cone shaped hood arranged over the said bubbling members, a central concave portion provided at the top of the said hood, means for conveying the discharge of said overflow into the said concave portion, a refrigerating device arranged outside the said distilling apparatus, a controllable duct adapted to lead part of the feed liquid through the said refrigerating device and to discharge the same into the said portion, a gutter provided at the lower edge of said hood and a controllable duct leading from the said gutter out of the apparatus.

In testimony whereof I have hereunto set my hand in presence of two witnesses.

RENÉ VALLAT.

Witnesses:
  C. Van Nelsen,
  Gregory Phelan.